United States Patent
Liu et al.

(10) Patent No.: US 8,724,899 B2
(45) Date of Patent: May 13, 2014

(54) METHOD OF PROCESSING AN IMAGE AND CORRESPONDING DEVICE

(75) Inventors: Debing Liu, Beijing (CN); Zhibo Chen, Beijing (CN); Xiaodong Gu, Beijing (CN); Feng Xu, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 89 days.

(21) Appl. No.: 13/578,003

(22) PCT Filed: Feb. 11, 2010

(86) PCT No.: PCT/CN2010/000189
§ 371 (c)(1),
(2), (4) Date: Aug. 9, 2012

(87) PCT Pub. No.: WO2011/097752
PCT Pub. Date: Aug. 18, 2011

(65) Prior Publication Data
US 2012/0314952 A1    Dec. 13, 2012

(51) Int. Cl.
*G06K 9/34* (2006.01)

(52) U.S. Cl.
USPC .......................................................... 382/173

(58) Field of Classification Search
None
See application file for complete search history.

(56) References Cited

U.S. PATENT DOCUMENTS

| 6,417,861 | B1 * | 7/2002 | Deering et al. ............. 345/589 |
| 2009/0010554 | A1 | 1/2009 | Eskelinen |
| 2009/0220152 | A1 | 9/2009 | Tiwari et al. |
| 2010/0033633 | A1 * | 2/2010 | Dane et al. ................. 348/625 |

FOREIGN PATENT DOCUMENTS

| CN | 1285214 | 11/2006 |
| CN | 1867075 | 11/2006 |
| CN | 101472177 | 7/2009 |
| WO | WO2006/082276 | 8/2006 |
| WO | WO2009/136437 | 11/2009 |

OTHER PUBLICATIONS

Search Rept:Nov. 25, 2010.

* cited by examiner

*Primary Examiner* — Daniel Mariam
*Assistant Examiner* — Feng Niu
(74) *Attorney, Agent, or Firm* — Robert D. Shedd; Patricia A. Verlangieri

(57) ABSTRACT

A method for processing an image divided into blocks of pixels is disclosed. The method comprises the steps of:
- detecting, for each block, a largest sub-block whose pixels have an equal luminance value;
- identifying, for each block, if the detected largest sub-block is or is not a natural texture;
- determining, for each block, a block blockiness level on the basis of the number of pixels within the detected largest sub-block and on the basis of the identification step; and
- processing the image on the basis of the block blockiness levels.

8 Claims, 4 Drawing Sheets

METHOD OF PROCESSING AN IMAGE AND CORRESPONDING DEVICE

This application claims the benefit, under 35 U.S.C. §365 of International Application PCT/CN2010/000189, filed Feb. 11, 2010, which was published in accordance with PCT Article 21(2) on Aug. 18, 2011 in English

1. FIELD OF THE INVENTION

The invention relates to image processing. More precisely, the invention concerns a method for processing an image divided into blocks.

2. BACKGROUND OF THE INVENTION

Blockiness is one of the main artifacts in images encoded by block based codecs. Accurately determining the blockiness level of an image or of image blocks is necessary to evaluate the image quality and consequently helps the processing of the image. As an example, when filtering an image, a stronger filter is applied on blocks with high blockiness levels while lower or no filter is applied on the other blocks, i.e. those with low blockiness levels.

Blockiness can be defined as the discontinuity at the boundaries of adjacent blocks in an image. Therefore, many known methods for determining a blockiness level operate at macroblocks' boundaries. These methods do not appropriately manage blockiness propagation. Indeed, due to motion compensation, blockiness artifacts are propagated from reference images into predicted images. Consequently, blockiness artifacts in the predicted images are not necessarily aligned with macroblock boundaries. In this case, known methods fail to determine an accurate blockiness level. In addition, such known methods do not accurately determine blockiness level when a deblocking filter is applied. Such a deblocking filter is for example used when encoding a video according to H.264 video coding standard. When a deblocking filter is applied, the discontinuity at the macroblock boundaries is decreased. In this case, known methods fail to determine accurate blockiness levels solely based on the difference at the boundaries. Finally, such known methods fail to accurately determine the blockiness level of images with large plain or complicated texture.

3. BRIEF SUMMARY OF THE INVENTION

The object of the invention is to overcome at least one of these drawbacks of the prior art.

To this aim the invention relates to a method for processing an image divided into blocks of pixels comprising the steps of:
- detecting, for each block, a largest sub-block whose pixels have an equal luminance value;
- identifying, for each block, if the detected largest sub-block is or is not a natural texture;
- determining, for each block, a block blockiness level on the basis of the number of pixels within the detected largest sub-block and on the basis of the identification step; and
- processing the image on the basis of the block blockiness levels.

The method of processing is not influenced by blockiness propagation. Therefore, its efficiency is increased. Advantageously, the method further comprises determining an image blockiness level for the image by averaging the block blockiness levels and wherein the image is processed on the basis of the image blockiness level.

According to a particular characteristic, the processing step comprises one of the steps belonging to the set comprising:
- encoding step;
- filtering step; and
- distributing step.

According to an aspect of the invention, the identification step comprises, when a deblocking filter is applied on the image, identifying the detected largest sub-block as natural texture when the detected largest sub-block reaches at least two opposite block borders.

According to another aspect of the invention, the identification step comprises, when no deblocking filter is applied on the image or when no information is provided on if deblocking filter is applied or not, identifying the detected largest sub-block as natural texture when the detected largest sub-block exceeds at least two opposite block borders.

Therefore, the method of processing is not badly influenced by the use of a deblocking filter.

As an example, the block blockiness level BBL for a block is calculated as follows:

$$BBL = \begin{cases} 0 & \text{when the detected largest subblock is natural texture} \\ 1 & \text{when } T2 \leq N \\ N/T2 & \text{when } T1 \leq N < T2 \\ 0 & \text{when } N < T1 \end{cases}$$

where T1 and T2 are threshold values and N is the number of pixels within the detected largest sub-block.

As a variant, the block blockiness level BBL for a block is calculated as follows:

$$BBL = \begin{cases} 0 & \text{when the detected largest subblock is a natural texture} \\ 1 & \text{when } T2 \leq N \\ 0.5 & \text{when } T1 \leq N < T2 \\ 0 & \text{when } N < T1 \end{cases}$$

where T1 and T2 are threshold values and N is the number of pixels within the detected largest sub-block.

4. BRIEF DESCRIPTION OF THE DRAWINGS

Other features and advantages of the invention will appear with the following description of some of its embodiments, this description being made in connection with the drawings in which.

5. DETAILED DESCRIPTION OF THE INVENTION

Figure 1:
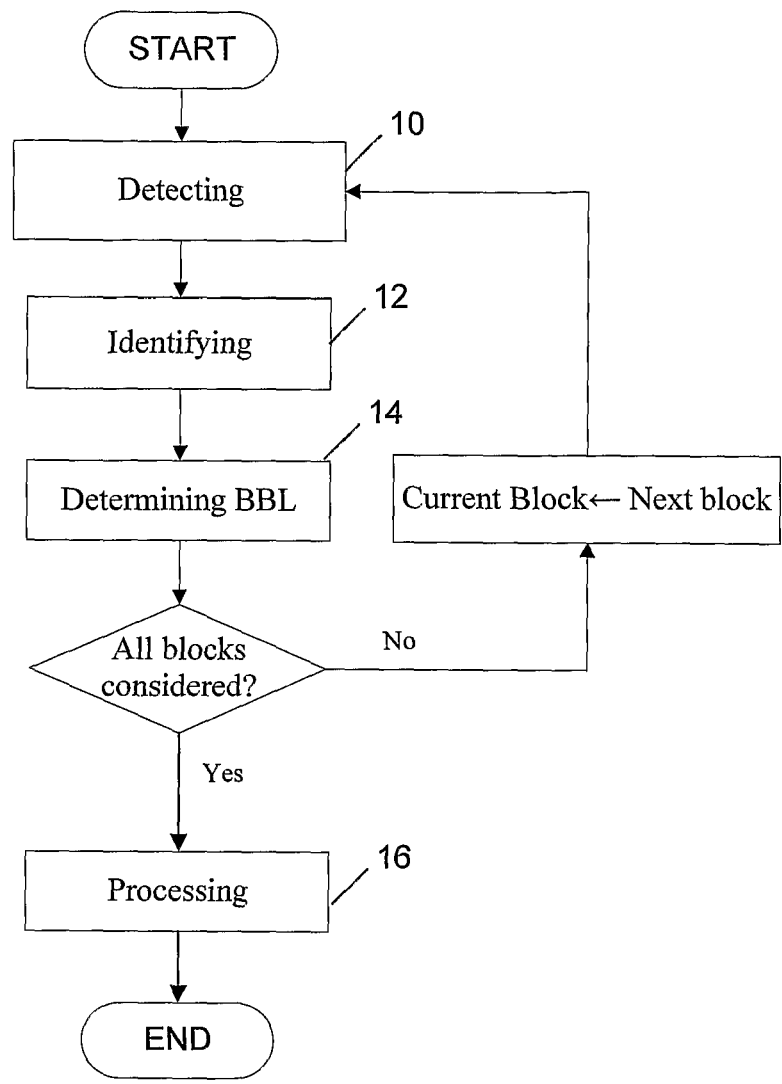
FIG. 1 illustrates a processing method according to a first embodiment of the invention.

With reference to FIG. 1, the method of processing an image divided into blocks of pixels is described with respect to FIG. 1. According to a specific embodiment the blocks are macroblocks.

Figure 2:
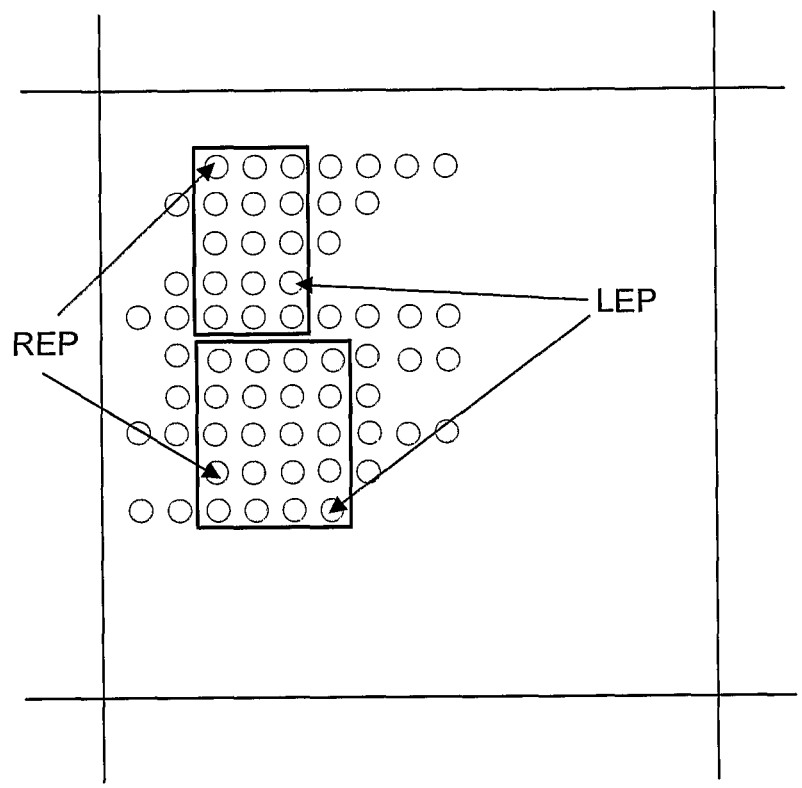
FIG. 2 illustrates a detail of the processing method according to the first embodiment of the invention.

At step 10, the largest sub-block whose pixels have an equal luminance value is detected within the current block. As an example illustrated on FIG. 2, the largest sub-block is detected as follows:

detecting the longest line of pixels with equal luminance value in every horizontal row of the current block and recording the start and end position of the longest line and the corresponding equal luminance value;

comparing, for each recorded equal luminance value, the recorded equal luminance values of the neighboring rows and merging into one sub-block the adjacent detected longest lines with the same recorded equal luminance values.

The rightmost start position (RSP) and the leftmost end position (LEP) of the horizontal rows are recorded as the new start and end positions of the merged sub-block, separately. The largest sub-block in the current block is the merged sub-block with the maximum number of pixels. On FIG. 2, the detected sub-block is therefore the sub-block B2 comprising grey pixels. Indeed, the sub-block B1 comprises less pixels. If both have same number of pixels we can choose to keep the first detected one.

According to a variant, vertical rows and longest columns are considered instead of horizontal rows and longest lines.

At step 12, the detected largest sub-block is identified as a natural texture or a non natural texture. When a deblocking filter is applied (such as for images encoded according to H.264 using default deblocking filter or for images encoded according to MPEG2 with a de-blocking filter applied as post-processing), the detected largest sub-block is identified as a natural texture when the detected largest sub-block reaches at least two opposite block borders of the current block (e.g. top and bottom borders and/or left and right borders) and as a non natural texture otherwise.

When no deblocking filter is applied (such as for images encoded according to MPEG2 or for images encoded according to H.264 with deblocking filter disabled, or for the images for which no information is provided on if deblocking filter is applied or not, i.e. when we do not know if a deblocking filter is or is not used) the detected largest sub-block is identified as a natural texture when the detected largest sub-block exceeds at least two opposite block borders of the current block (e.g. top and bottom borders and/or left and right borders) and as a non natural texture otherwise. Here 'exceeds' means that the largest sub-block not only reaches the borders of the current block, but also has the same luminance value with at least one line of pixels of the neighboring blocks next to the borders.

At step 14, a block blockiness level BBL is determined for the current block on the basis of the number of pixels within the detected largest sub-block and on the basis of the results of the identification step 12. The block blockiness level BBL for the current block is calculated for example as follows:

$$BBL = \begin{cases} 0 & \text{when the detected largest subblock is a natural texture} \\ 1 & \text{when } T2 \le N \\ N/T2 & \text{when } T1 \le N < T2 \\ 0 & \text{when } N < T1 \end{cases}$$

where $T1$ and $T2$ are threshold values and $N$ is the number of pixels within the detected largest sub-block. The default value of $(T_1, T_2)$ is $(30, 80)$. For the images with very complicated texture, $T1$ and $T2$ can be adjusted a little lower, but not lower than $(20, 70)$. For the images with large plain texture, they can be adjusted a little higher, but not higher than $(50, 100)$. The case $N<T_1$ refers to the case where the size of the detected largest sub-block is small. In this case the block blockiness level is set to zero.

Another example to calculate block blockiness level BBL is as below:

$$BBL = \begin{cases} 0 & \text{when the detected largest subblock is a natural texture} \\ 1 & \text{when } T2 \le N \\ 0.5 & \text{when } T1 \le N < T2 \\ 0 & \text{when } N < T1 \end{cases}$$

where $T1$ and $T2$ are threshold values and $N$ is the number of pixels within the detected largest sub-block. The thresholds $(T1, T2)$ can be set in the same way as in the above example. According to other embodiments, it can set more thresholds to divide the block blockiness level into finer granularity.

If all blocks of the image have been considered then the method continues to step 16, otherwise the next block in the image is considered as the new current block and the method goes back to step 10.

At step 16, the image is processed on the basis of the block blockiness levels BBL. According to an advantageous embodiment, the image is filtered on a block basis, the blocks having a high blockiness level being filtered more strongly than the block having a low blockiness level. According to a variant, the image is encoded with encoding parameters adapted on the basis of the blockiness level. As an example, the quantization parameter is adapted on a block level. To get a stable quality, the blocks having a high blockiness level are encoded with a lower quantization parameter than the blocks having a low blockiness level. According to another embodiment the image is distributed by over a channel. Knowing the image quality in the user end thanks to the BBL, the video distributor adjusts the image coding parameters (e.g. quantization parameter, deblocking filter parameters) and possibly the channel bandwidth on the basis of these BBL. In addition, the distributors can charge differently the end user according to the received video quality level evaluated by the block blockiness levels or by a video blockiness level. Advantageously, the video blockiness level is determined on the basis of the block blockiness levels determined for the blocks of all the images of the video. As an example, the video blockiness level is determined as the average of these block blockiness levels BBL. According to a variant, the video blockiness level VBL is determined as a function of these block blockiness levels BBL considering spatial and temporal masking.

Figure 3:
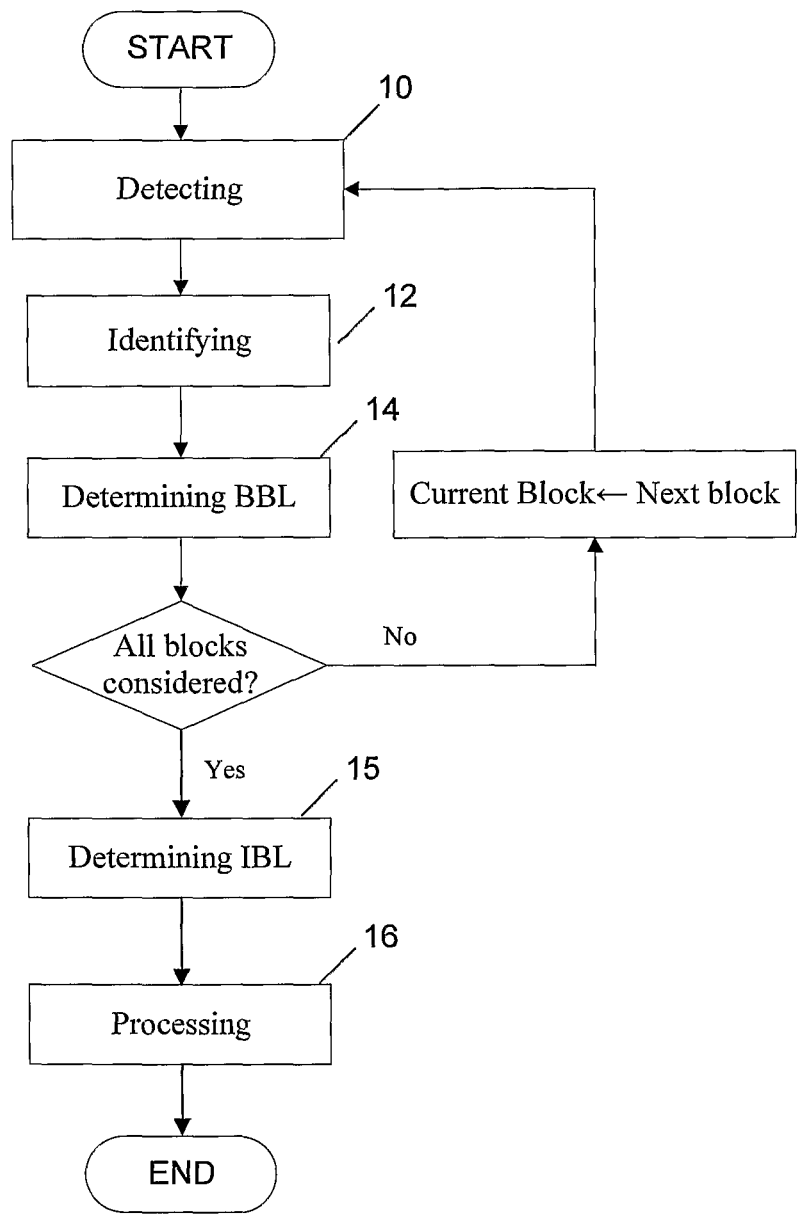
FIG. 3 illustrates a processing method according to another embodiment of the invention.

According to another embodiment illustrated on FIG. 3, an image blockiness level IBL is determined at step 15 on the basis of the block blockiness levels. As an example, the image blockiness level is determined as the average of the block blockiness levels BBL. According to a variant, the image blockiness level IBL is determined as the sum of the weighted block blockiness levels BBL. The weight of block is determined based on the region of interest ROI information. The block located in the region with higher interest has higher weight than the block located in the region with lower interest. The image is thus processed at step 16 on the basis of this image blockiness level IBL.

Figure 4:
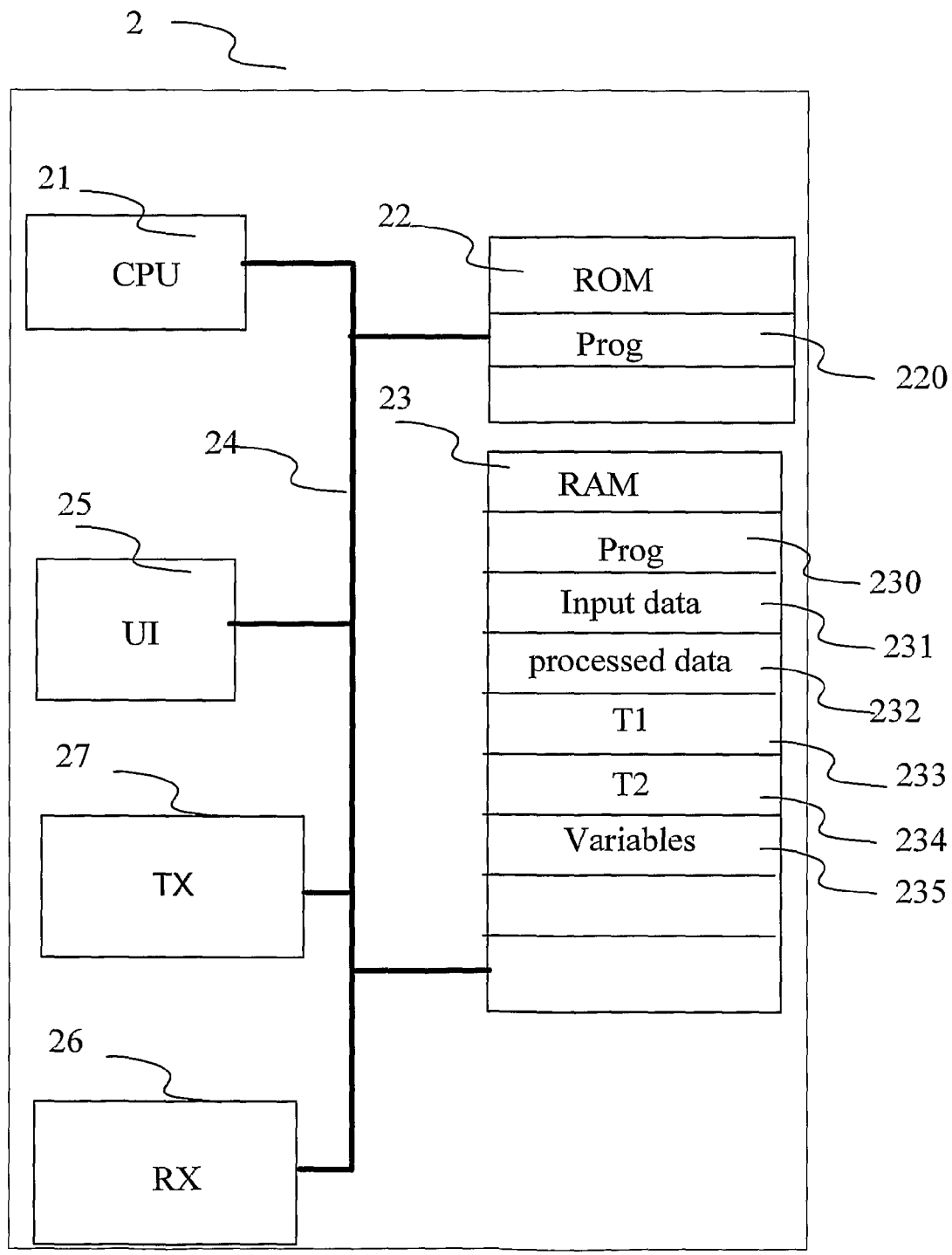
FIG. 4 illustrates a processing device according to the invention.

FIG. 4 represents an exemplary architecture of an image processing device 2 according to the invention. The processing device 2 comprises following elements that are linked together by a data and address bus 24:

a microprocessor 21 (or CPU), which is, for example, a DSP (or Digital Signal Processor);

a ROM (or Read Only Memory) 22;

a RAM (or Random Access Memory) 23;
a user interface 25;
a reception module 26 for reception of images;
possibly a module 27 for transmission of processed images (i.e. the output of the processing method) to an application and/or a display.

Each of these elements of FIG. 3 are well known by those skilled in the art and won't be disclosed further. In each of mentioned memory, the word <<register>> used in the specification can correspond to area of small capacity (some bits) or to very large area (e.g. a whole program or large amount of received or decoded data). ROM 22 comprises a program "prog" 220.

Algorithms of the processing method according to the invention are stored in the ROM 22. When switched on, the CPU 21 uploads the program 220 in the RAM and executes the corresponding instructions. RAM 23 comprises:
in a register 230, the program executed by the CPU 21 and uploaded after switch on of the processing device 2;
input data in a register 231;
processed data in different state of the processing method in a register 232;
T1 and T2 in registers 233 and 234 respectively; and
other variables used for processing the image in a register 235 (e.g. filter parameters encoding parameters, and/or monitoring parameters, etc).

According to a variant of the invention, the digital part of the processing device 2 is implemented in pure hardware configuration (e.g. in one or several FPGA, ASIC or VLSI with corresponding memory) or in a configuration using both VLSI and DSP.

The invention claimed is:

1. A method for processing an image divided into blocks of pixels comprising the steps of:
detecting, for each block, a largest sub-block whose pixels have an equal luminance value;
identifying, for each block, if the detected largest sub-block is or is not a natural texture;
determining, for each block, a block blockiness level on the basis of the number of pixels within the detected largest sub-block and on the basis of said identification step; and
processing said image on the basis of said block blockiness levels.

2. The method according to claim 1, said method further comprises determining an image blockiness level for said image by averaging the block blockiness levels and wherein said image is processed on the basis of said image blockiness level.

3. The method according to claim 1, wherein said processing step comprises one of the steps belonging to the set comprising:
encoding step;
filtering step; and
distributing step.

4. The method according to claim 1, wherein the identification step comprises, when a deblocking filter is applied on said image, identifying the detected largest sub-block as natural texture when the detected largest sub-block reaches at least two opposite block borders.

5. The method according to claim 1, wherein the identification step comprises, when no deblocking filter is applied on said image or when no information is provided on if deblocking filter is applied or not, identifying the detected largest sub-block as natural texture when the detected largest sub-block exceeds at least two opposite block borders.

6. The method according to claim 1, wherein the block blockiness level BBL for a block is calculated as follows:

$$BBL = \begin{cases} 0 & \text{when the detected largest subblock is natural texture} \\ 1 & \text{when } T2 \leq N \\ N/T2 & \text{when } T1 \leq N < T2 \\ 0 & \text{when } N < T1 \end{cases}$$

where T1 and T2 are threshold values and N is the number of pixels within the detected largest sub-block.

7. The method according to claim 1, wherein the block blockiness level BBL for a block is calculated as follows'

$$BBL = \begin{cases} 0 & \text{when the detected largest subblock is a natural texture} \\ 1 & \text{when } T2 \leq N \\ 0.5 & \text{when } T1 \leq N < T2 \\ 0 & \text{when } N < T1 \end{cases}$$

where T1 and T2 are threshold values and N is the number of pixels within the detected largest sub-block.

8. A device for processing an image divided into blocks of pixels comprising:
an element for detecting, for each block, a largest sub-block whose pixels have an equal luminance value;
an element for identifying, for each block, if the detected largest sub-block is or is not a natural texture;
an element for determining, for each block, a block blockiness level on the basis of the number of pixels within the detected largest sub-block and on the basis of the identification by said means for identifying; and
an element for processing said image on the basis of said block blockiness levels.

* * * * *